United States Patent [19]

Wade et al.

[11] Patent Number: 5,280,398

[45] Date of Patent: Jan. 18, 1994

[54] REMOVABLE DATA STORAGE DRIVE SECURITY MODULE WITH LOCKABLE WRITE PROTECT FEATURE

[75] Inventors: Jack P. Wade, La Jolla; Raymond Lederer, Carlsbad; Norman D. Young, Escondido, all of Calif.

[73] Assignee: Z Microsystems, Inc., Carlsbad, Calif.

[21] Appl. No.: 8,214

[22] Filed: Jan. 25, 1993

Related U.S. Application Data

[63] Continuation of Ser. No. 611,755, Nov. 13, 1990, which is a continuation-in-part of Ser. No. 438,528, Nov. 17, 1989, Pat. No. 5,126,890.

[51] Int. Cl.$^5$ .................. G11B 15/04; G11B 19/04; G11B 5/012
[52] U.S. Cl. .................. 360/60; 360/98.01; 360/98.04; 360/137
[58] Field of Search .............. 360/98.01, 98.04, 60, 360/137

[56] References Cited

U.S. PATENT DOCUMENTS

| | | | |
|---|---|---|---|
| 4,062,049 | 12/1977 | Dirks | 360/78 |
| 4,593,192 | 6/1986 | Slattery et al. | 250/229 |
| 4,752,911 | 6/1988 | Prevost et al. | 365/52 |
| 4,833,554 | 5/1989 | Dalziel et al. | 360/98.04 |
| 4,870,643 | 9/1989 | Bultman et al. | 371/11.1 |
| 4,912,580 | 3/1990 | Hanson | 360/98.01 |
| 4,956,733 | 9/1990 | Dalziel | 360/105 |

OTHER PUBLICATIONS

IBM Technical Bulletin, vol. 30, #8, Jan. 1988, "Security Device for a Disk Drive".

*Primary Examiner*—A. J. Heinz
*Assistant Examiner*—Jefferson Evans
*Attorney, Agent, or Firm*—Spensley Horn Jubas & Lubitz

[57] ABSTRACT

A security module for a removable disk drive having a lockable hardware write protect feature for use with docking base. Additional features provided by the invention are an enclosure and electrical connection interface designed to reduce or eliminate radio frequency interference (RFI) and electromagnetic interference (EMI), a removal mechanism that provides for orderly powering down of a disk drive before removal of the security module from a docking base, and a module latching and lock mechanism that provides for positive, lockable securement of the module into a docking base.

16 Claims, 3 Drawing Sheets

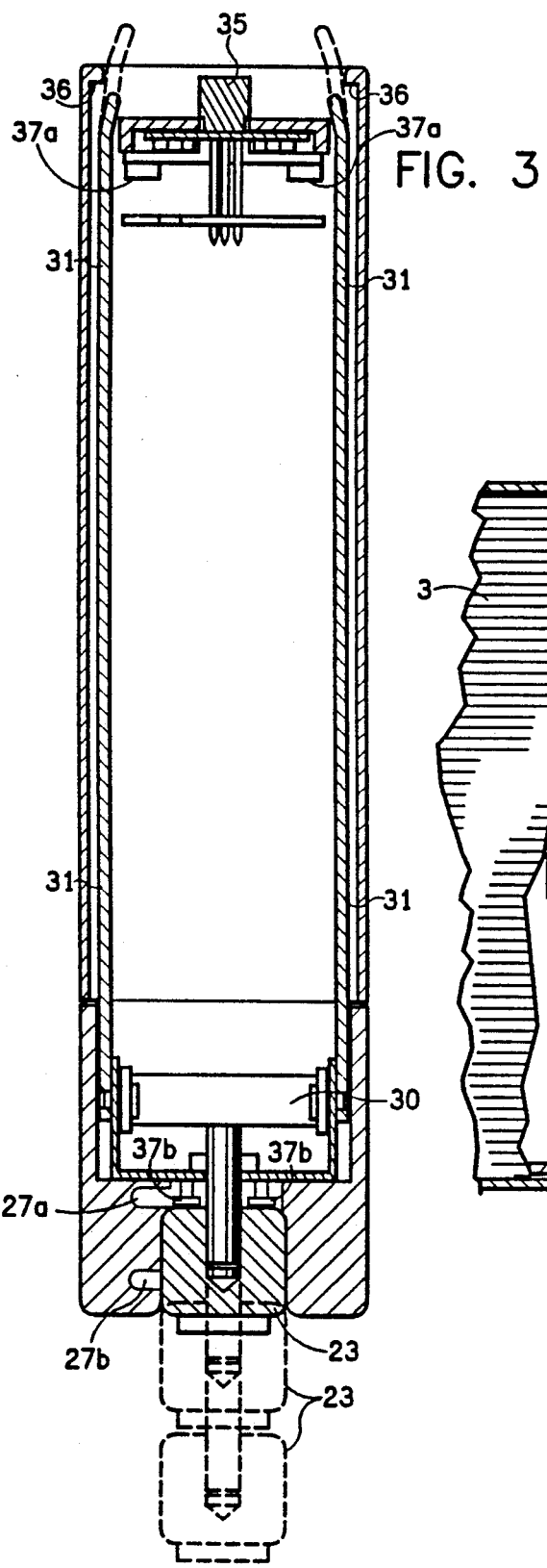
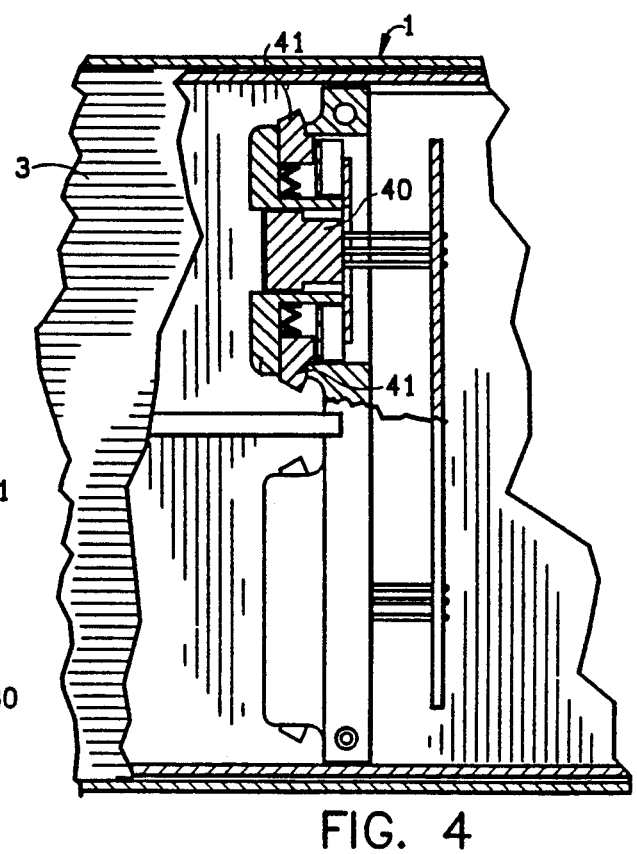
FIG. 3
FIG. 4

REMOVABLE DATA STORAGE DRIVE SECURITY MODULE WITH LOCKABLE WRITE PROTECT FEATURE

This is a continuation of co-pending application Ser. No. 07/611,755 filed on Nov. 13, 1990, which is a continuation-in-part of Ser. No. 438528 filed Nov. 17, 1989 U.S. Pat. No. 5,126,890, issued on Jun. 30, 1992.

BACKGROUND OF THE INVENTION

1. Field of the Invention

This invention relates to removable disk drives for computer systems, and more particularly to a security module for a removable disk drive having a lockable write protect feature, and an associated docking base.

2. Description of Related Art

In the early history of computer data storage devices, magnetic disk drives having removable magnetic platters were commonly used. This configuration of equipment permitted the use of a number of sets of platters with one drive unit, resulting in substantial economies since much of the cost of such a disk drive unit was in the motor drive unit, read/write head structure, and control electronics. Another advantage of such a configuration is that the platters could be removed and safely stored for security purposes.

One common feature of such removable platter disk drive until was a "write protect" switch that activated a hardware control system of the disk drive itself. The write protect feature prevented data from being written to the platters, thereby protecting the data on such platters from inadvertent alteration or erasure. While software could be used to provide a degree of write protection, a hardware implementation of the feature was found to be more secure from software error and international software tampering. However, a disadvantage of the prior art is that the operator was required to remember to activate the write-protect switch. Moreover, such drives did not prevent accidental or negligent deactivation of the write-protect switch.

More recently, the cost of computer disk drives has decreased dramatically to the point that the platters, drive motor, read/write head structure, and control electronics are sold as a single unit, with the platters typically hermetically sealed within the unit. With the platters sealed within the disk drive, reliability of such drives is substantially improved over disk drives with removable platters.

A disadvantage of sealed disk drives has been that they are normally not designed to be easily removed from a computer system. Such removability is desirable for a number of reasons, including ready replacement of defective drives and transportation of data from one computer system to another. However, probably the most important reasons for such removability is to permit removal of drives containing sensitive data for security purposes. In some cases, data may be so sensitive that a removed drive must be stored in a vault when not in use.

Another disadvantage of commonly available sealed drives is that they typically do not provide a dedicated, lockable write protection feature. While some drives have interfaces which include a WRITE signal line which can be trapped and blocked to emulate a write-protect input, in other drives (such as disk drives having a Small Computer System Interface), all commands are logically coded, and no provision exists for activating a dedicated write-protect input or blocking a WRITE signal without very sophisticated (and hence expensive) command monitoring and decoding.

With the advent of small format disk drives (e.g., commonly available 5¼" and 3½" form factor drives), a number of removable disk drives have been introduced. Some of these products include a "docking base" coupled to a computer system and having a power supply and computer interface, with the disk drive itself being removable from the docking base. In other products, the disk drive, power supply, and computer interface form a removable unit, although the computer system may have a "docking interface" for making electrical connections to the removable unit.

However, a continuing disadvantage of such removable drives is that they do not provide a lockable, hardware write protection feature.

It is therefore desirable to provide a removable disk drive unit having a lockable, hardware write protection feature. It is also desirable to provide a locking switch mechanism for controlling the write protection feature, in order to provide better security for the system. The present invention meets these needs as well as providing other desirable features and functions.

SUMMARY OF THE INVENTION

The present invention provides a docking base and a removable disk drive module having a lockable hardware write protection feature. The invention may be configured such that a low-voltage power supply and computer interface are situated within the docking base, or the power supply is situated within the removable module, or the power supply is external to the docking base and removable module. The docking base may be configured to receive one or more removable modules, and dimensioned to fit removable modules of various sizes. The removable modules may be dimensioned to fit disk drives of various sizes.

Additional features provided by the invention are (1) a lockable tamper-resistant drive module having an electrical connection interface designed to reduce or eliminate radio frequency interference (RFI) and electromagnetic interference (EMI), (2) a unique drive module removal mechanism that provides for orderly powering down of a disk drive before removal of the module from a docking base, (3) a unique drive module latching and lock mechanism that provide for positive, lockable securement of the module into a docking base; (4) a usage counter to indicate the number of insertion/removals of the removable module and/or power applications to the enclosed disk drive; and (5) an electronic encryption circuit in the docking base so that data written on the disk drive in a removable module can only be deciphered when that removable module is used in a base unit.

The invention permits complete removal of a disk drive module from its docking base for security purposes, data transport, and replacement. The inventive removable module can be securely locked into a docking base, as well as locked into a write-protect mode or read-write mode such that the mode cannot be changed without a key or combination to the lock. The ability to lock the removable module into a write-protect mode provides data security when the disk drive module is in use, without concern for accidental or negligent alteration or erasure of data. Further, the removable module can be securely locked into a docking base in an inoperative mode, so that the data cannot be read and the removable module cannot be removed. In addition, the removable module can be securely locked out of a docking base, so that the disk drive cannot even be read, thus providing an added measure of data security.

Further aspects of the present invention will become apparent from the following detailed description when considered in conjunction with the accompanying drawings. It should be understood, however, that the detailed description and the specific examples, while representing the preferred embodiment and several alternative embodiments of the invention, are given by way of illustration only.

BRIEF DESCRIPTION OF THE DRAWINGS

FIG. 3 is a top, partial cross-section view of a removable module, with the handle shown in three different positions.

FIG. 4 is a top view of a docking base, showing in cross-section one connector and removable module latching mechanism.

Like reference numbers in the various drawings refer to like elements.

DETAILED DESCRIPTION OF THE INVENTION

The following description is of the best presently contemplated modes of carrying out the invention. This description is made for the purpose of illustrating the general principles of the invention and should not be taken in a limiting sense.

Figure 1:
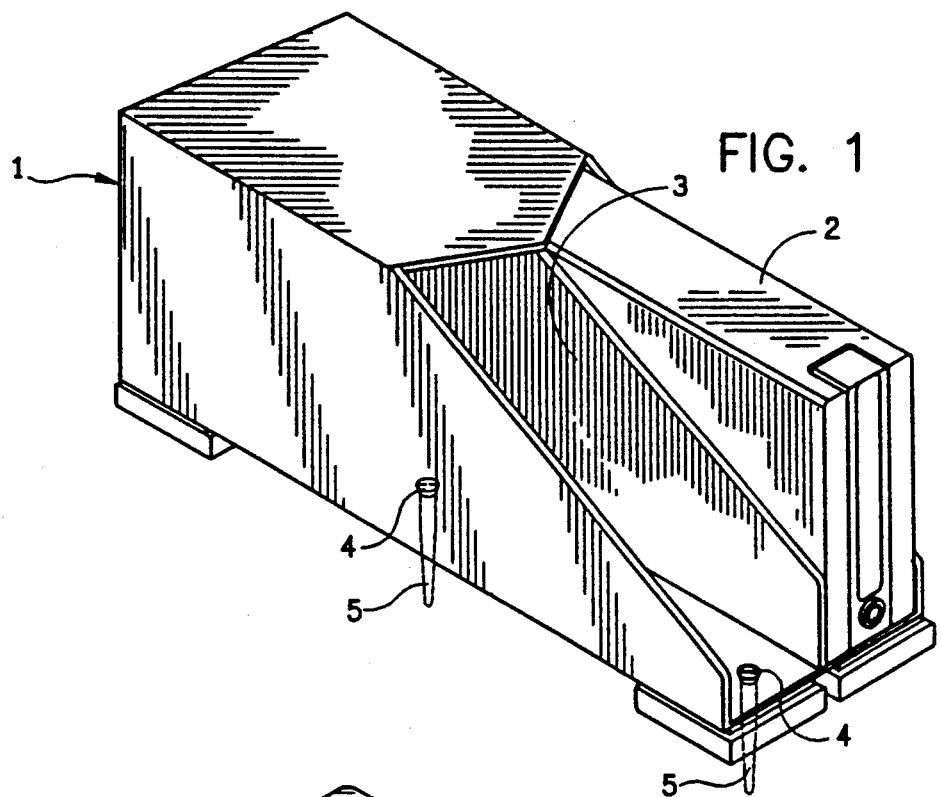
FIG. 1 is a perspective view of the preferred embodiments of the invention, showing a dual-bay docking base and one removable module inserted within the docking base.

FIG. 1 shows a dual-bay docking base 1 and one removable module 2 inserted within a bay 3 of the docking base 1. The docking base 1 may be provided with mounting holes 4 so that the docking base 1 may be secured to a table, rack, or other structure. By providing the mounting holes 4 within each bay 3 of the docking base 1, the mounting hardware (such as the screws 5 shown in FIG. 1) in each bay 3 of the docking base 1 is inaccessible for removal when a removable module 2 is mounted within the bay 3.

It should be noted that the functions and features of the docking base 1 can be incorporated directly into a computer rack, enclosure, or work station, without necessarily providing a separate component structure of the type shown in FIG. 1.

In the preferred embodiment, each removable module 2 is sized to house a 3½" form factor disk drive, and each bay 3 of the docking base 1 is sized to receive such removable modules 2. Single-bay or multiple-bay docking bases 1 may be fashioned as desired. The removable modules 2 may be dimensioned to accommodate disk drives of other sizes (e.g., 5¼" form factor drives), or be configured to accommodate different sizes of drives (e.g., a nominal 5¼" form factor removable module 2 could also accommodate smaller form factor drives, such as 3½" drives). Similarly, the docking base 1 may be dimensioned to accommodate removable modules 2 of different sizes.

Figure 2:
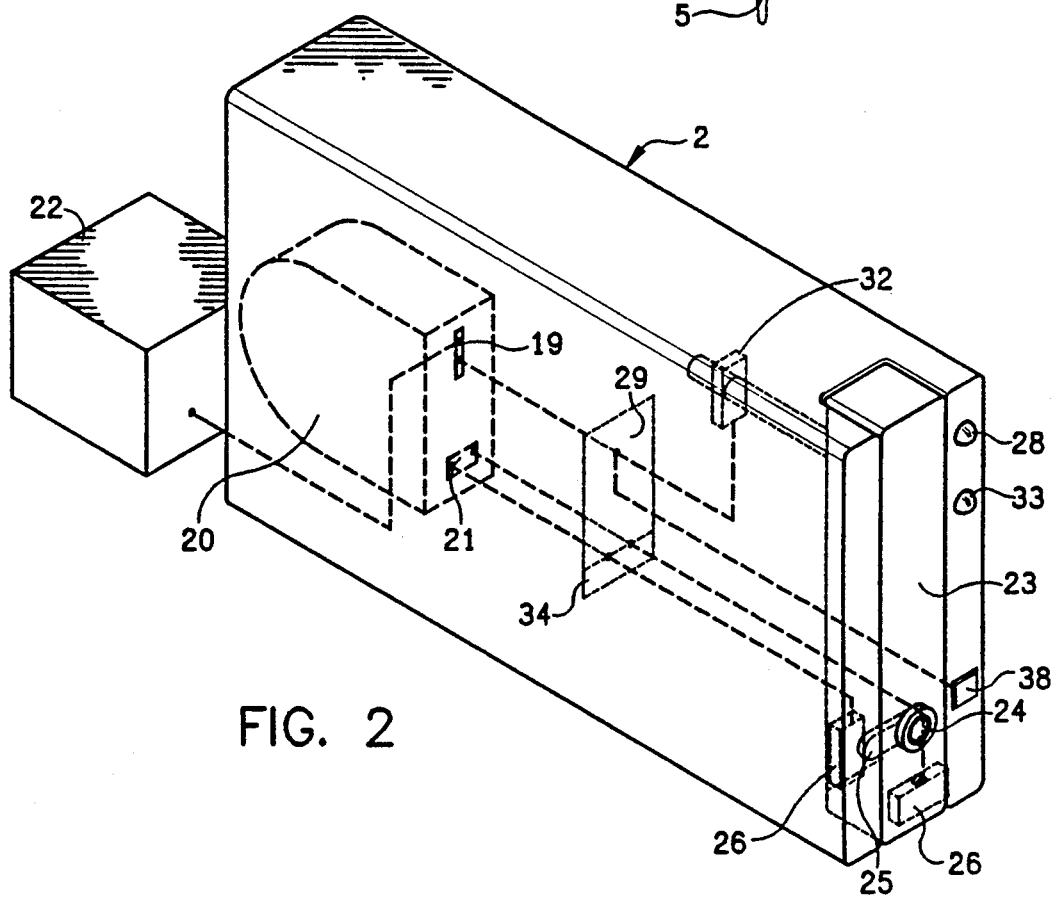
FIG. 2 is a perspective, transparent view of a removable module.

FIG. 2 shows a removable module 2 in greater detail. Each removable module 2 is configured to receive a disk drive 20, which preferably is similar to Hitachi Model No. DK312C or Fujitsu Model No. M2314AS. Such drives provide a dedicated write-protect input 21 which, when coupled to an appropriate control signal (e.g., a ground connection or voltage signal), prevents writing to the disk drive medium. However, other drives lacking a built-in write-protect input may be used by providing a control circuit that adds such write-protection to the disk drive (for example, by monitoring signal commands from the computer system to the disk drive, and blocking any WRITE signals or encoded commands from being transmitted to the disk drive). Such a control circuit would include a write-protect input 21.

Such drives may also provide a spin-down signal input 19 which, when coupled to an appropriate control signal or command, provides for orderly parking of the read/write heads of the disk drive 20 and stops rotation of the disk platters. Alternatively, such drives may automatically park their read/write heads when power to the disk drive 20 is disconnected.

The disk drive 20 is coupled to a power supply 22. The power supply 22 may be located within each removable module 2, or within a docking base 1, or external to the invention, such as in a computer rack.

Each removable module 2 is provided with an extensible, lockable handle 23. When unlocked, the handle 23 provides a convenient means for removing the removable module 2 from a bay 3 of a docking base 1, and for carrying the removable module 2 about. FIG. 3 shows a top view of a removable module 2 with the handle 23 shown in three different positions: retracted, intermediate, and extended. As shown in FIGS. 2 and 3, the handle 23 normally fits flush against the front of the removable module 2. The handle 23 thus does not normally provide a convenient means for pulling the removable module 2 out of the docking base 1.

Situated in each removable module 2 is a lock 24, which is located in the handle 23 in the preferred embodiment. For simplicity, the lock 24 is preferably a key lock, but other locks, such as mechanical or electronic combination locks or rotary tumbler locks, may be used. In the preferred embodiment, the lock 24 is at least a four-position lock, the four positions corresponding to "non-removable, no write protect", "non-removable, write protect", "removable, no write protect", and "removable, write protect". Alternatively, the lock 24 may have positions corresponding to "non-removable, no write protect", "non-removable, write protect", (optionally, "non-removable, power off"), and "removable" (or, optionally, "removable, power off"). The front of the removable module 2 adjacent the lock 24 may be appropriately marked to indicate the meaning of each position of the lock 24.

In the preferred embodiment, the lock 24 has a lock cam 25 which rotates to different positions as the lock 24 is turned, via a key, to corresponding positions. When the lock 24 is turned to a "non-removable" position, the lock cam 25 preferably physically interacts with the front of the removable module 2, such as by protruding into a first slot 27a cut within the removable module 2 (see FIG. 3). In such a configuration, the lock 24 prevents extension of the handle 23 if the handle 23 is retracted when the lock 24 is placed in a locked position with the lock cam 25 protruding into the first slot 27a. Conversely, the lock 24 prevents retraction of the handle 23 if the handle 23 is extended when the lock 24 is placed in a locked position.

At least one write-protect switch 26 (one for each write protect position of the lock 24) is situated such that one such switch is activated by the lock cam 25 when the lock 24 is turned to a "write protect" position. Each switch may be a photo-interrupt type switch (i.e., activated by the interruption of a light source when the lock cam 25 passes through an opening in the switch), a microswitch, or any other type of switch.

Each write-protect switch 26, when activated by the lock cam 25, provides an appropriate control signal to the write-protect input 21 of the disk drive 20. The ability to lock the removable module 2 into a write-protect mode provides data security when the removable module 2 is in use, without concern for accidental or negligent alteration or erasure of data on the disk drive 20. It should be noted that the disk drive 20 is a removable module 2 can be write-protected even when the removable module 2 is not inserted within a docking base 1. This permits such a removable module 2 to be removed from station to station without concern for writing over important data.

Optionally, each write protect switch 26 is also coupled to a control circuit 29 that provides an indication when write protection has been activated in response to the status of the write-protect switches 26. Such an indication may be, for example, a signal light 28 (such as a light emitting diode).

Other combinations of a lock and switches may be used to accomplish the same functions as the particular configuration of the lock 24 and write-protect switches 26 described above.

The removable module 2 optionally may have a secondary write-protect switch (not shown), such as a dual-in-line package (DIP) switch, located in the removable module 2 such that the secondary switch is not accessible when the removable module 2 is inserted within a bay 3 of a docking base 1. The secondary switch is coupled to the write-protect input 21 of the disk drive 20 so as to provide a means of overriding the write-protect switches 26 so that the disk drive 20 is always write-protected despite the setting of the lock 24.

Alternatively, the secondary write-protect switch may be located within the docking base 1 and electrically coupled via a connector to the write-protect input 21 of the disk drive 20 in each inserted removable module 2. This configuration provides a means of overriding the write-protect switches 26 of every inserted removable module 2 so that its disk drive 20 is always write-protected despite the setting of the lock 24 of the removable module 2.

In the preferred embodiment of the invention, the handle 23 of the removable module 2 provides a number of features. In one embodiment of the invention, after the lock 24 is turned to a position permitting removal of the removable module 2 from a docking base 1, pulling the top of the handle 23 to the intermediate position activates a removal switch 32 (see FIG. 2). The removal switch 32 may be a photo-interrupt type switch, a microswitch, or any other type of switch. Activation of the removal switch 32 sends a spin-down signal to the spin-down signal input 19 of a disk drive 20 so equipped. This permits orderly parking of the read/write heads of the disk drive 20, thereby lessening the chances of damage to the data upon removal of the removable module 2.

In an alternative embodiment, useful for disk drives 20 lacking a spin-down signal input 19, activation of the removal switch 32 interrupts power to the disk drive 20. This activates any automatic head parking feature of the disk drive 20, and, more importantly, permits the disk platters to stop spinning before the removable module 2 is pulled from the docking base 1. Again, this lessens the chances of damage to the data upon removal of the removable module 2.

Providing a spin-down period for the platters of a disk drive 20 is preferable to simply pulling the removable module 2 out of the docking base 1, which can cause a disk head crash against the still-spinning platters even in disk drives having a self-parking feature for the read/write heads.

The intermediate spin-down position of the handle 23 may be indicated tactilely by providing a detent at the proper position, thereby signifying to an operator that the handle 23 should not be pulled further until the spin-down operation is completed. Optionally, a solenoid-type latch (not shown) may be activated by the activation of the removal switch 32 to prevent further extension of the handle 23 until the spin-down operation is completed. The solenoid latch would then release the handle 23 for further extension.

The removal switch 32 optionally may be coupled to the control circuit 29 to provide an indication when a spin-down operation is under way. Such an indication may be, for example, a signal light 33 (such as a light emitting diode) and/or a sound transducer (such as piezoelectric beeper) 34. In the preferred embodiment, the control circuit 29 causes the signal light 33 to flash red while the disk platters are still spinning, and to turn to a steady green after spin-down is completed. In the preferred embodiment, the control circuit 29 also causes the sound transducer 34 to sound an alarm if the handle 23 is pulled past its intermediate position before spin-down is completed.

As should be clear from the above description, locking the handle 23 into its retracted position while a removable module 2 is inserted within a bay 3 of a docking base 1 prevents removal of the removable module 2. It should also be noted that, in the preferred embodiment, locking the handle 23 into its extended position permits insertion of a removable module 2 into a bay 3 of a docking base 1 but prevents operation of its disk drive 20, since the removal switch 32 remains in its activated position until the handle 23 is fully retracted. In an alternative embodiment, the lock 24 may be configured to extend a projection beyond the body of a removable module 2 when the handle 23 is locked into an extended position, or if the lock 24 is turned while the removable module 2 is not inserted into a docking base 1. The projection serves to block insertion of the removable module 2 into a docking base 1 by interference with the sides, top, and/or bottom of a bay 3. In either configuration, the removable module 2 is effectively locked out of a docking base 1, so that the disk drive 20 cannot even be read.

A second slot 27b, cut within the removable module 2 (see FIG. 3), may be provided as an additional security feature. When the handle 23 is in the intermediate position, the lock cam 25 can be turned to protrude into the second slot 27b. Locking the handle 23 into the intermediate position causes the disk drive 20 to be spun-down and powered-off, while preventing removal of the removable module 2 from its docking base 1.

If the lock 24 is provided with a "non-removable, power off" position, the lock 24 activates an optional switch (not shown) that turns off power to the disk drive 20. Such a switch may be used in lieu of or in addition to the second slot 27b described above.

Referring now to FIG. 3, the rear of the removable module 2 includes an electrical connector 35 that provides an interface between the disk drive 20 within the removable module 2 and a mating connector 40 (shown in FIG. 4) in a bay 3 of the docking base 1. The electrical connector 35 provides for both power and signal lines. The electrical connector 35 and mating connector 40 are preferably low-insertion force or zero-insertion force connectors. The mating connector 40 is coupled via a cable (not shown) to a computer system.

The docking base 1 optionally may include a data encryption circuit electrically coupled between the disk drive 20 and a computer system (not shown) for encrypting and decrypting all data stored on the disk drive 20. The encryption circuit may conform, for example, to the National Data Encryption Standard. Such encryption circuits are well-known, and available commercially on a single integrated circuit. If a removable module 2 is stolen, the encrypted data on the enclosed disk drive 20 will still be secure.

The rear of the removable module 2 also includes latch flanges 36 configured to engage corresponding spring-loaded latches 41 situated within a bay 3 of the docking base 1, as shown in FIG. 4. When the removable module 2 is fully inserted into a bay 3, the electrical connector 35 mates with the mating connector 40, and the spring-loaded latches 41 engage and hold the latch flanges 36 of the removable module 2. The removable module 2 is thus positively and securely held within the bay 3 of the docking base 1. If the lock 24 is then positioned to a "non-removable" setting, the removable module 2 cannot be removed from the docking base 1 because the handle 23 is secured into its retracted position by the lock 24.

In the preferred embodiment, the handle 23 is connected via a pivoting lever 30 to two release rods 31 such that, as the handle is pulled 23 from its retracted position all the way to its extended position, the pivoting lever 30 pushes the release rods 31 away from the front of the removable module 2 to a rearward extended position (shown in outline in FIG. 3). The extended release rods 31 push against an angled face of the spring-loaded latches 41, forcing the latches 41 to retract. The latches 41 thus release engagement with the latch flanges 36, and the removable module 2 can be pulled by the handle 23 out of the docking base 1, separating the electrical connector 35 from the mating connector 40.

As noted above, the functions and features of the docking base 1 can be incorporated directly into a computer rack or enclosure. Thus, the mating connector 40 and spring-loaded latches 41 can be situated directly within a computer rack or enclosure rather than in a separate structure, while still functioning as a docking base 1 for a removable module 2.

Other configurations of latching and release mechanisms can also be used to accomplish the same functions as the particular configuration of described above. One such mechanism includes a solenoid latch releasable by the position of the lock 24 as determined by the write-protect switches 26 or similar switches.

Figure 5A:
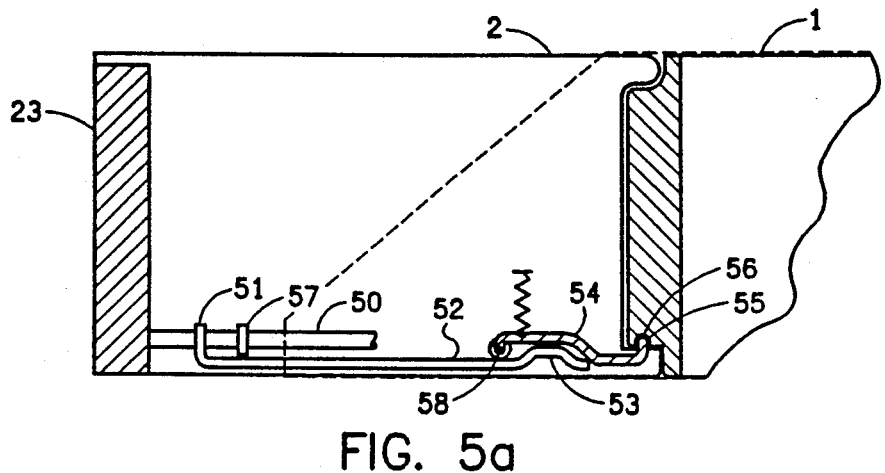
FIG. 5a is a side cross-sectional view of a docking base and a removable module, showing an alternative latching mechanism in an engaged position.
Figure 5B:
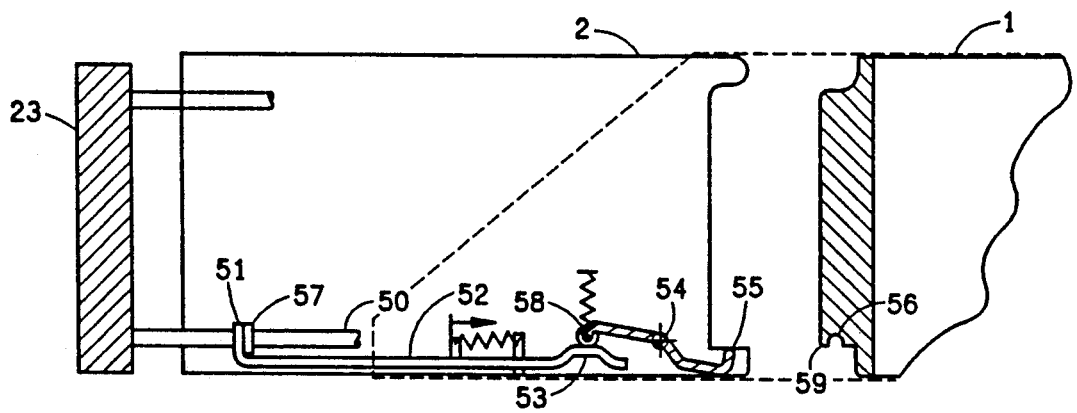
FIG. 5b is a side cross-sectional view of a docking base and a removable module, showing an alternative latching mechanism in a disengaged position.

Another such mechanism is shown in FIGS. 5a and 5b. In FIG. 5a a handle shift 50 is attached through a slip collar 51 to a latch actuator 52 having a raised region 53 near or at the other end. The latch actuator 52 is preferably spring-biased towards the rear of the removable module 2. The latch actuator 52 is in mechanical contact with a spring-biased pivotable latch 54 having a catch flange 55. When the handle 23 is recessed within the removable module 2, the catch flange 55 engages a latch recess 56 in the docking base 1. An angled slide 59 on the docking base 1 forces the catch flange 55 down when the removable module 2 is inserted into the docking base 1, thus guiding the catch flange 55 into engagement with the latch recess 56.

When the handle 23 is pulled out towards its extended position, the handle shaft 50 slides through the slip collar 51 until a stop 57 (such as an o-ring) affixed to the handle shaft 50 catches on the slip collar 51 (see FIG. 5b). Further pulling of the handle 23 will cause the latch actuator 52 to be pulled forward, thereby causing the raised region 53 of the latch actuator 52 to pivot the latch 54. Preferably, a roller 58 is provided on the latch 54 as the contact point with the latch actuator 52, to reduce wear and the pull force. As the latch 54 pivots, the latch flange 55 disengages from the latch recess 56, thereby permitting the removable module 2 to be extracted from the docking base 1.

An additional feature provided by the invention is a mechanical and electrical configuration of the docking base 1 and removable module 2 designed to reduce or eliminate radio frequency interference (RFI) and electromagnetic interference (EMI). In the preferred embodiment, the case of the removable module 2 is of unitary construction, with all seams welded closed or shielded by internally positioned shielding materials (e.g., metal plates or foils). The number of openings in the removable module 2 is minimized to reduce the number of possible sites for RFI and EMI leakage. The shape of the docking base 1 in the preferred embodiment is such that the electrical connections between each removable module 2 and the docking base 1 are recessed within the shielding walls of the docking base 1. In addition, the electrical connector 35 is surrounded by the sides of the enclosure of the removable module 2, up to the latch flanges 36. Engagement of the spring-loaded latches 41 with the latch flanges 36 effectively forms an interlocking shield around the electrical connector 35 and the mating connector 40. Such interlocking substantially reduces or entirely eliminates RFI and EMI leakage from the electrical connector 35 and the mating connector 40.

Another feature permitted by the unitary construction of the removable module 2 is that all internal components (e.g., the disk drive 20, control circuit 29, etc.) can be mounted so that no fasteners are exposed except through the recessed region on the front of the removable module 2 that accommodates the handle 23. Thus, as shown in FIG. 3, rear fasteners 37a secure the electrical connector 35 to the removable module 2 from the interior of the module. The front bezel of the removable module 2, which includes the handle 23, is secured to the module by front fasteners 37b. Since the front fasteners 37b are only accessible when the handle 23 is in its fully extended position, the removable module 2 can only be disassembled when the handle 23 is unlocked and fully extended.

Thus, the invention permits removal of a removable module 2 from a docking base 1 for transportation in a manner that prevents disassembly of the module to get access to the disk drive 20. Since the handle 23 can be locked into its recessed or intermediate, power-off position, access to the data on the disk drive 20 is denied, thereby enhancing security.

Another security feature option of the present invention is the addition of one or more counters (mechanical or electrical) to indicate (1) the number of insertions of a removable module 2 into a docking base 1, and/or (2) the number of times a disk drive 20 within a removable module 2 is powered up or down. Such a counter may be integrated into a removable module 2, or affixed within a docking base bay 3. The counter may optionally have a display 38 (see FIG. 2) to indicate the count value. In the preferred embodiment of the invention, a counter circuit is provided as part of the control circuit 29, and incremented by changes in state of the removal switch 32. Preferably, the counter circuit includes nonvolatile memory (such as a mechanical register or electrically-alterable read only memory) for storing the number of activations of the removal switch 32.

In summary, the lock 24 of the removable module 2 provides a means for activating the write-protect input of the enclosed disk drive 20. The docking base 1 may be securely fastened to other structures, such that the docking base 1 cannot be removed if it contains one or more locked removable modules 2. The removable module 2 can be positively and securely held within a bay 3 of a docking base 1 via a latching mechanism which can only be released by extension of the handle 23. The removable module 2 can be locked into place in a docking base 1 by locking the handle 23. The handle 23 further provides a means for safely spinning down an enclosed disk drive 20 before removal of its removable module 2 from a docking base 1. Moreover, the removable module 2 and the docking base 1 are designed to reduce tampering, and to reduce or eliminate radio frequency interference (RFI) and electromagnetic interference (EMI) by shielding points of possible signal leakage.

A number of embodiments of the present invention have been described. Nevertheless, it will be understood that various modifications may be made without departing from the spirit and scope of the invention. For example, although the illustrated embodiment has been described in the context of magnetic disk drive data storage devices, the invention could easily be adapted to other data storage devices, such as write-once-read-mostly (WORM) optical drives and erasable optical drives. Accordingly, it is to be understood that the invention is not to be limited by the specific illustrated embodiment, but only by the scope of the appended claims.

We claim:

1. A system for enclosing a write-protectable data storage drive such that the data storage drive is removable, the system including:
   a. removable module means for removably receiving a data storage drive of the type that includes write-protect means for preventing writing of data to the data storage drive while allowing reading of data from the data storage drive during data transfer operations, and having a hardware write-protect control input for accepting control signals for selectively enabling and disabling the write-protect means, the removable module means further including:
      i. first connector means for coupling the data storage drive to power and signal lines external to the removable module means;
      ii. switch means, coupled to the write-protect control input of the data storage drive, for providing a control signal to the write-protect control input for selectively enabling and disabling the write protect means of the data storage drive;
      iii. lockable control means, mounted on the removable module means, for selectively enabling and disabling the switch means;
   b. base unit means for removably receiving at least one removable module means, the base unit means including second connector means for coupling the first connector means to power and signal lines external to the base unit means; and
   c. counting means, actuatable by insertion of the removable module means into the base unit means, for providing a count value indicative of the number of insertions of the removable module means into the base unit means.

2. The system of claim 1, further including display means, coupled to the counting means, for indicating the count value of the counting means.

3. The system of claim 2, further including non-volatile memory means, coupled to the counting means, for storing the count value of the counting means.

4. A system for enclosing a write-protectable data storage drive such that the data storage drive is removable, the system including:
   a. removable module means for removably receiving a data storage drive of the type that includes write protect means for preventing writing of data to the data storage drive while allowing reading of data from the data storage drive during data transfer operations, and having a hardware write-protect control input for accepting control signals for selectively enabling and disabling the write-protect means, the removable module means further including:
      i. first connector means for coupling the data storage drive to power and signal lines external to the removable module means;
      ii. switch means, coupled to the write-protect control input of the data storage drive, for providing a control signal to the write-protect control input for selectively enabling and disabling the write protect means of the data storage drive;
      iii. lockable control means, mounted on the removable module means, for selectively enabling and disabling the switch means;
   b. base unit means for removably receiving at least one removable module means, the base unit means including second connector means for coupling the first connector means to power and signal lines external to the base unit means; and
   c. counting means, actuatable by a change in the application of power to the data storage drive within the removable module means, for providing a count value indicative of the number of applications of power to the data storage drive.

5. The system of claim 4, further including display means, coupled to the counting means, for indicating the count value of the counting means.

6. The system of claim 5, further including non-volatile memory means, coupled to the counting means, for storing the count value of the counting means.

7. A system for enclosing a write-protectable data storage drive such that the data storage drive is removable, the system including:
   a. removable module means for removably receiving a data storage drive of the type that includes write-protect means for preventing writing of data to the data storage drive while allowing reading of data from the data storage drive during data transfer operations, and having a hardware write-protect control input for accepting control signals for selectively enabling and disabling the write-protect means, the removable module means further including:
      i. first connector means for coupling the data storage drive to power and signal lines external to the removable module means;
      ii. switch means, coupled to the write-protect control input of the data storage drive, for providing a control signal to the write-protect control input for selectively enabling and disabling the write protect means of the data storage drive;
      iii. lockable control means, mounted on the removable module means, for selectively enabling and disabling the switch means; and
   b. base unit means for removably receiving at least one removable module means, the base unit means including:
      i. second connector means for coupling the first connector means to power and signal lines external to the base unit means; and
      ii. encryption circuit means, electrically connected to the signal lines, for encrypting data to be stored on the data storage drive, and for decrypting data stored on the data storage drive.

8. A removable module for a data storage drive adapted to be received in a base unit, including:
   a. means for receiving a data storage drive of the type that includes write-protect means for preventing writing of data to the data storage drive while allowing reading of data from the data storage drive during data transfer operations, and having a hardware write-protect control input for accepting control signals for selectively enabling and disabling the write-protect means;
   b. first connector means for coupling the data storage drive to power and signal lines of a base unit;
   c. switch means, coupled to the write-protect control input of the data storage drive, for providing a control signal to the write-protect control input for selectively enabling and disabling the write protect means of the data storage drive;
   d. lockable control means, mounted on the removable module, for selectively enabling and disabling the switch means;
   e. counting means, actuatable by insertion of the removable module into the base unit, for providing a count value indicative of the number of insertions of the removable module into the base unit.

9. The system of claim 8, further including display means, coupled to the counting means, for indicating the count value of the counting means.

10. The system of claim 9, further including nonvolatile memory means, coupled to the counting means, for storing the count value of the counting means.

11. A removable module for a data storage drive adapted to be received in a base unit, including:
   a. removable receiving means for removably receiving a data storage drive of the type that includes write-protect means for preventing writing of data to the data storage drive while allowing reading of data from the data storage drive during data transfer operations, and having a hardware write-protect control input for accepting control signals for selectively enabling and disabling the write-protect means;
   b. first connector means for coupling the data storage drive to power and signal lines of a base unit;
   c. switch means, coupled to the write-protect control input of the data storage drive, for providing a control signal to the write-protect control input for selectively enabling and disabling the write protect means of the data storage drive;
   d. lockable control means, mounted on the removable module, for selectively enabling and disabling the switch means;
   e. counting means, actuatable by a change in the application of power to the data storage drive within the removable module, for providing a count value indicative of the number of applications of power to the data storage drive.

12. The system of claim 11, further including display means, coupled to the counting means, for indicating the count value of the counting means.

13. The system of claim 12, further including nonvolatile memory means, coupled to the counting means, for storing the count value of the counting means.

14. A removable module for a data storage drive adapted to be received in a base unit, including:
   a. removable receiving means for removably receiving a data storage drive of the type that includes write-protect means for preventing writing of data to the data storage drive while allowing reading of data from the data storage drive during data transfer operations, and having a hardware write-protect control input for accepting control signals for selectively enabling and disabling the write-protect means;
   b. first connector means for coupling the data storage drive to power and signal lines of a base unit;
   c. switch means, coupled to the write-protect control input of the data storage drive, for providing a control signal to the write-protect control input for selectively enabling and disabling the write protect means of the data storage drive;
   d. lockable control means, mounted on the removable module, for selectively enabling and disabling the switch means;
   e. a handle attached to the removable module and having a retracted position and at least one extended position;
   f. means for securing the data storage drive within the removable module such that the data storage drive cannot be removed from the removable module when the handle is in its retracted position.

15. The system of claim 14, wherein the handle is lockable by means of the lockable control means.

16. A system for enclosing a write-protectable data storage drive such that the data storage drive is removable, the system including:
   a. removable module means for removably receiving a data storage drive of the type that includes write-protect means for preventing writing of data to the data storage drive while allowing reading of data from the data storage drive during data transfer operations, and having a hardware write-protect control input for accepting control signals for selectively enabling and disabling the write-protect means, the removable module means further including:

i. first connector means for coupling the data storage drive to power and signal lines external to the removable module means;

ii. switch means, coupled to the write-protect control input of the data storage drive, for providing a control signal to the write-protect control input for selectively enabling and disabling the write protect means of the data storage drive;

iii. lockable control means, mounted on the removable module means, for selectively enabling and disabling the switch means;

iv. releasable latch means for securing the removable module means to a base unit means, the releasable latch means including a handle coupled to a latch having a catch flange, the handle having a retracted position and at least one extended position, and wherein the releasable latch is released when the handle is extended from its retracted position to at least one extended position; and b. base unit means for removably receiving at least one removable module means, the base unit means including:

i. second connector means for coupling the first connector means to power and signal lines external to the base unit means; and ii. a latch recess for receiving the catch flange of the latch.

* * * * *